United States Patent [19]

Teed et al.

[11] 4,165,288
[45] Aug. 21, 1979

[54] PROCESS OF TREATING WASTE WATER FROM A TEXTILE VAT DYEING OPERATION TO PRODUCE A CONCENTRATE FOR REUSE

[75] Inventors: Richard K. Teed, Greenwood; Ernest A. Freeman, Jr., Ware Shoals, both of S.C.

[73] Assignee: Riegel Textile Corporation, New York, N.Y.

[21] Appl. No.: 812,911

[22] Filed: Jul. 5, 1977

[51] Int. Cl.² .................... B01D 13/00; B01D 31/00
[52] U.S. Cl. ............................. 210/23 H; 210/321 R; 210/433 M; 8/38; 8/81
[58] Field of Search ............. 210/456, 433 M, 321 R, 210/23 F, 23 H; 8/81, 18, 34, 38

[56] References Cited

U.S. PATENT DOCUMENTS 3,998,740  12/1976  Bost et al. ................. 210/433 M X

FOREIGN PATENT DOCUMENTS 2347329  4/1975  Fed. Rep. of Germany ........ 210/23 H
2510309  9/1976  Fed. Rep. of Germany ........ 210/23 H
51-68478  6/1976  Japan ..................... 210/23 H

OTHER PUBLICATIONS

Michaels, "New Separation Technique for the CPI", from Chem. Eng. Progress, vol. 64, No. 12, Dec. 1968, pp. 31–43.
Brandon et al., "Hyperfiltration Pilot Plant for Textile Wastewater Renovation," from *American Dyestuff Reporter*, Oct. 1975.

*Primary Examiner*—Frank A. Spear, Jr.
*Attorney, Agent, or Firm*—Bell, Seltzer, Park & Gibson

[57] ABSTRACT

Process of treating waste water from a textile vat dyeing operation containing water, vat dyes, and dissolved and undissolved impurities including salts, lint, foreign matter, etc. to produce a concentrate suitable for direct reuse in the vat dyeing operation to conserve the use of dyes and water, as follows. Undissolved impurities of a predetermined particle size are filtered out. Thereafter, the waste water is concentrated and filtered down to a concentrate of a ratio of from about 30/1 to 200/1 while removing excess water and a substantial portion of the remaining impurities and retaining substantially all of the vat dyes and a desired amount of water. The latter step is preferably performed by circulating the waste water through a reverse osmosis filtration device, while separating the waste water into a permeate containing excess water an a substantial portion of the remaining impurities including salts and a concentrate containing substantially all of the vat dyes and a desired amount of water, and by removing the permeate and retaining the concentrate for use in the dyeing operation.

4 Claims, 6 Drawing Figures

PROCESS OF TREATING WASTE WATER FROM A TEXTILE VAT DYEING OPERATION TO PRODUCE A CONCENTRATE FOR REUSE

This invention relates to a process of treating waste water from a textile vat dyeing operation containing water, vat dyes, and dissolved and undissolved impurities including salts, lint, foreign matter, etc. to produce a concentrate suitable for direct resue in the vat dyeing operation to conserve the use of dyes and water.

BACKGROUND OF THE INVENTION

Vat dyes, particularly indigo, are conventionally utilized for dyeing textile fabrics, especially cotton fabrics, because of their fastness to washings, alkalis, mercerization and bleaching. Vat dyes may be divided into several groups according to their chemical nature and origin of which two of the most important are the indigoids and the anthraquinones. These vat dyes are marketed in the form of paste or powder and must be first reduced usually with sodium hydrosulfite, and applied to the textile fabrics and then oxidized to the original insoluble form. These dyes, particularly indigo, are expensive at first cost and in application, but are widely used because of their above-described excellent fastness properties.

Various attempts to recover these vat dyes from a vat dyeing operation for reuse in the vat dyeing operation to conserve or save on the costs of these vat dyes have been attempted. However, none of these prior attempts to recover vat dyes have been commercially successful for various and sundry reasons. Accordingly, no practical and commercially feasible process for recovery of vat dyes, particularly indigo, from textile dyeing operations for reuse in the dyeing operations currently exists.

Examples of dye recovery processes, including vat dyes, previously proposed and considered with respect to the present invention may be seen from the following prior art patents:

| Patent Number | Inventor | Issue Date |
|---|---|---|
| U.S. 120,215 | Sawyer | October 24, 1871 |
| U.S. 137,636 | Thom et al | April 8, 1873 |
| U.S. 1,242,676 | Forsyth | October 9, 1917 |
| U.S. 1,303,426 | Wall | May 13, 1919 |
| U.S. 2,445,323 | Galatioto | July 20, 1948 |
| U.S. 3,801,276 | Gray | April 2, 1974 |
| U.S. 3,829,380 | Oohara | August 13, 1974 |
| British 2156 | Hugounenq | September 2, 1864 |
| British 2713 | Auchinvole | July 31, 1875 |

In a different area beginning in about the 1930's, various experimentation and work has been performed with respect to the filtering of water utilizing the principles of reverse osmosis and the use of hyperfiltration and ultrafiltration devices consisting generally of a porous substrate having a dynamic osmotic membrane formed thereon.

By definition, osmosis is generally defined as the passage of liquids or gases through membranes separating solutions of different degrees of concentration by diffusion from the solution in which they are more concentrated to the solution in which they are less concentrated, provided the membrane is permeable to them. Osmotic pressure is generally defined as that pressure which develops when a pure solvent is separated from a solution by a semi-permeable membrane which allows only the solvent molecule to pass through it. The osmotic pressure of the solution is then the excess pressure which must be applied to the solution so as to prevent the passage into it of the solvent through the semi-permeable membrane. Accordingly, reverse osmosis occurs when pressure, in excess of the osmotic pressure, is applied to the more concentrated solution to cause the solution to pass through the membrane to the less concentrated side. The solutes or other particles in the more concentrated solution would be prohibited from passing through the membrane which is not permeable to such solutes.

The distinction between ultrafiltration and hyperfiltration devices is not clearly defined. However, both are generally classified as reverse osmosis devices utilizing semi-permeable membranes as molecular filters to be utilized as the separating agent and pressure as the driving force. In hyperfiltration and ultrafiltration devices, a feed solution is fed into the membrane unit, usually consisting of a substrate tube and a membrane formed thereon, where water and certain solutes pass through the membrane under an applied hydrostatic pressure. The solutes whose sizes are larger than the pore sizes of the membranes are retained and concentrated. The pore structure of the membrane thus acts as a molecular filter, passing some of the smaller solutes and retaining the larger solutes. The pore structure of this molecular filter is such that it does not become plugged because the solutes are rejected at the surface and do not penetrate the membrane. Apparently, the difference between hyperfiltration and ultrafiltration is in the size of the small molecular weight solutes rejected by the membrane and prevented from passing therethrough, with the hyperfiltration membranes rejecting or preventing passage therethrough of much smaller molecular size solutes than the ultrafiltration membranes.

Much of the earlier work utilizing reverse osmosis filtration was sponsored by the Office of Saline Water of the U.S. Department of Interior and related to efforts for effecting desalination of saline water to produce fresh water, as will be seen in the prior art patents listed immediately below.

More recently, this work with reverse osmosis filtration processes and apparatus spread into other areas including the textile industry where reverse osmosis filtration units have been experimented with for purifying waste water from dyeing and other types of textile finishing operations for reuse of substantially all of the waste water by filtering out or separating substantially all of the dissolved and undissolved impurities including the dyes and salts from the waste water. Representative examples of this prior work may be seen in the immediately below listed prior art publications.

One of the problems which surfaced with respect to utilizing reverse osmosis devices in the textile industry for the filtering of waste water from dyeing operations to substantially purify the waste water for reuse of the water is in the normally high pH of the waste water from these textile dyeing operations. The high pH of from about 9 to 13 causes rapid deterioration of the dynamically formed membranes utilized in the reverse osmosis filtration devices. The pH could be lowered by the addition of acid to the waste water; however, this is a costly treatment and would render the process unpractical from a commercial and economical standpoint.

Prior art considered with respect to the present invention and relating to processes and apparatus utilizing generally the principle of reverse osmosis filtration are, as follows:

| Patent Number | Inventor | Issue Date |
|---|---|---|
| U.S. 1,825,631 | Horvath | September 29, 1931 |
| U.S. 2,987,472 | Kollsman | June 6, 1961 |
| U.S. 3,132,094 | McKelvey, Jr. | May 5, 1964 |
| U.S. 3,331,772 | Browncombe et al | July 18, 1967 |
| U.S. 3,396,103 | Huntington | August 6, 1968 |
| U.S. 3,457,170 | Havens | July 22, 1969 |
| U.S. 3,462,362 | Kollsman | August 19, 1969 |
| U.S. 3,552,574 | Lowe et al | January 5, 1971 |
| U.S. 3,625,885 | Geinopolos et al | December 7, 1971 |
| U.S. 3,654,148 | Bradley | April 4, 1972 |
| U.S. 3,758,405 | Fremont | September 11, 1973 |
| U.S. 3,795,609 | Hill et al | March 5, 1974 |
| U.S. 3,821,108 | Manijikian | June 28, 1974 |
| U.S. 3,839,201 | Miller | October 1, 1974 |
| U.S. 3,939,070 | Roth | February 17, 1976 |

Publications

"Hyperfiltration Pilot Plant For Textile Waste Water Renovation" by Craig A. Brandon, Ali El Nasher and John J. Porter, *American Dye Stuff Reporter*, October 1975 issue.

"Complete Reuse of Textile Dyeing Wastes Processed With Dynamic Membrane Hyperfiltration" by C. A. Brandon, S. J. Johnson, R. E. Minturn and J. J. Porter, *Textile Chemists and Colorists*, Volume 5, No. 7, Issued of July 1973.

Other prior art considered with respect to this invention and not classifiable within the above two groups of prior art, are as follows:

| Patent Number | Inventor | Issue Date |
|---|---|---|
| U.S. 1,175,948 | French | March 21, 1916 |
| U.S. 1,302,814 | Kuryla | May 6, 1919 |
| U.S. 1,822,006 | Bull | September 8, 1931 |
| U.S. 3,389,797 | Giardini | June 25, 1968 |
| U.S. 3,392,114 | Delcellier | July 9, 1968 |
| U.S. 3,419,493 | Pangle, Jr. | December 31, 1968 |
| U.S. 3,725,266 | Haviland | April 3, 1973 |
| U.S. 3,728,273 | Bruen et al | April 17, 1973 |
| U.S. 3,859,213 | Hunt | January 7, 1975 |
| U.S. 3,912,628 | Buscher | October 14, 1975 |

As may be seen from the above, all of the prior work, known to applicants, pertinent to this invention is related to (1) processes and apparatus for recapturing dyes including vat dyes from textile dyeing operations which do not utilize the principles of reverse osmosis filtration and which have not been commercially successful, and (2) processes and apparatus directed primarily to the purification of waste water including waste water from textile dyeing operations by reverse osmosis filtration principles and which may incidentally or secondarily provide for the recovery of dyes. The latter processes effectively filtered out by reverse osmosis all of the dissolved and undissolved impurities including dyes and salts and provided substantially pure water. The concentrate, therefore, contained reusable dye, but also contained a salt level too high for direct reuse in the dyeing operation.

No suggestion or realization is provided by the above-described prior art or by any processes or apparatus known to applicants for the utilization of the principles of reverse osmosis filtration primarily for the recovery of vat dyes in a form having a sufficiently low salt content suitable for direct reuse in the vat dyeing operation without further treatment.

OBJECTS AND SUMMARY OF THIS INVENTION

Accordingly, it is the object of this invention to provide a practical, commercial process for the treatment of waste water from a textile vat dyeing operation, particularly indigo, containing water, vat dyes, and dissolved and undissolved impurities including salts, lint, foreign matter, etc. to recover the vat dyes in a form suitable for direct reuse in the vat dyeing operations.

It has been found by this invention that the above object may be accomplished along with the further advantage of recovering a certain amount of water along with the vat dyes for reuse in the dyeing operation by providing a process of treating the waste water to produce a concentrate suitable for direct reuse in the vat dyeing operation to conserve the use of both dyes and water, including the following steps. Undissolved impurities including lint and foreign matter are removed from the vat dye waste water by filtering out undissolved particles of a predetermined particle size. Thereafter, the waste water is concentrated and filtered down to a concentrate of a ratio of from about 30/1 to 200/1, while removing excess water and a substantial portion of the remaining impurities including salts and retaining substantially all of the vat dyes and a desired amount of water. This concentrate is suitable for immediately using in the chemical feed tank and mixing into the dye mix of a conventional vat dye range without further treatment including separation of filtration thereof.

The latter step of the above-described broad process is preferably performed by circulating the waste water through a reverse osmosis filtration device, while separating the waste water into a permeate containing excess water and a substantial portion of the remaining impurities including salts and a concentrate containing substantially all of the vat dyes and a desired amount of water, and by removing the permeate and retaining the concentrate for reuse in the dyeing operation.

The first step in the above-described broad process is performed by passing the waste water from the vat dyeing operation through a screen filter having passageways therein of a predetermined size for removal of undissolved particles of the predetermined size and larger.

To overcome the above-described problem of deterioration of the dynamically formed osmotic membranes on the reverse osmosis filtration substrate tubes due to the high pH of the waste water from the textile vat dyeing operations, it has been found by this invention that if the waste water is circulated into contact with the reverse osmosis filtration substrate tubes having a pore size of from about 0.10 to 0.50 microns, without a dynamically formed osmotic membrane thereon, that a self-formed membrane will build up on the tubes of the vat dyes in the waste water for obtaining the desired reverse osmosis filtering and separating operation allowing passage through the membrane of substantially all of the remaining dissolved and undissolved impurities including salts, while preventing passage of substantially all of the vat dyes.

In order to prevent excessive build-up of this self-formed vat dye membrane on the substrate tubes and to maintain the desired filtering and separating action, it has been found that this build-up will be retarded by causing a turbulent flow of the waste water in contact with the substrate tubes by the use of a predetermined pressure and temperature of from about 400 psig to 1300 psig or higher and from about 130° F. to about 212° F.

Moreover, it has been found that the pressure of about 400 psig to 1300 psig or higher produces a higher flux rate for the permeate through the reverse osmosis substrate tubes and that the temperatures of from about 130° F. to about 212° F. allow a greater portion of the impurities to pass in the permeate through the reverse osmosis filtration substrate tubes.

With the above-described process utilizing a self-formed vat dye membrane, the waste water can be circulated through reverse osmosis filtration means at the normal pH of the waste water of from about 9 to 13 without concern of deterioration of the membrane and without the expense of further treatment thereof to lower the pH.

While the above sets forth the broad novel process of this invention which provides for the first time a commercially feasible process which effectively recaptures the vat dyes for reuse without the necessity of further treatment to lower the salt content, etc., specific embodiments of this process will be set forth in the detailed description to follow.

BRIEF DESCRIPTION OF THE DRAWINGS

Some of the objects and advantages of this invention having been stated, other objects and advantages will appear as the description proceeds, when taken in conjunction with the accompanying drawings, in which.

DETAILED DESCRIPTION OF THE INVENTION

Figure 1:
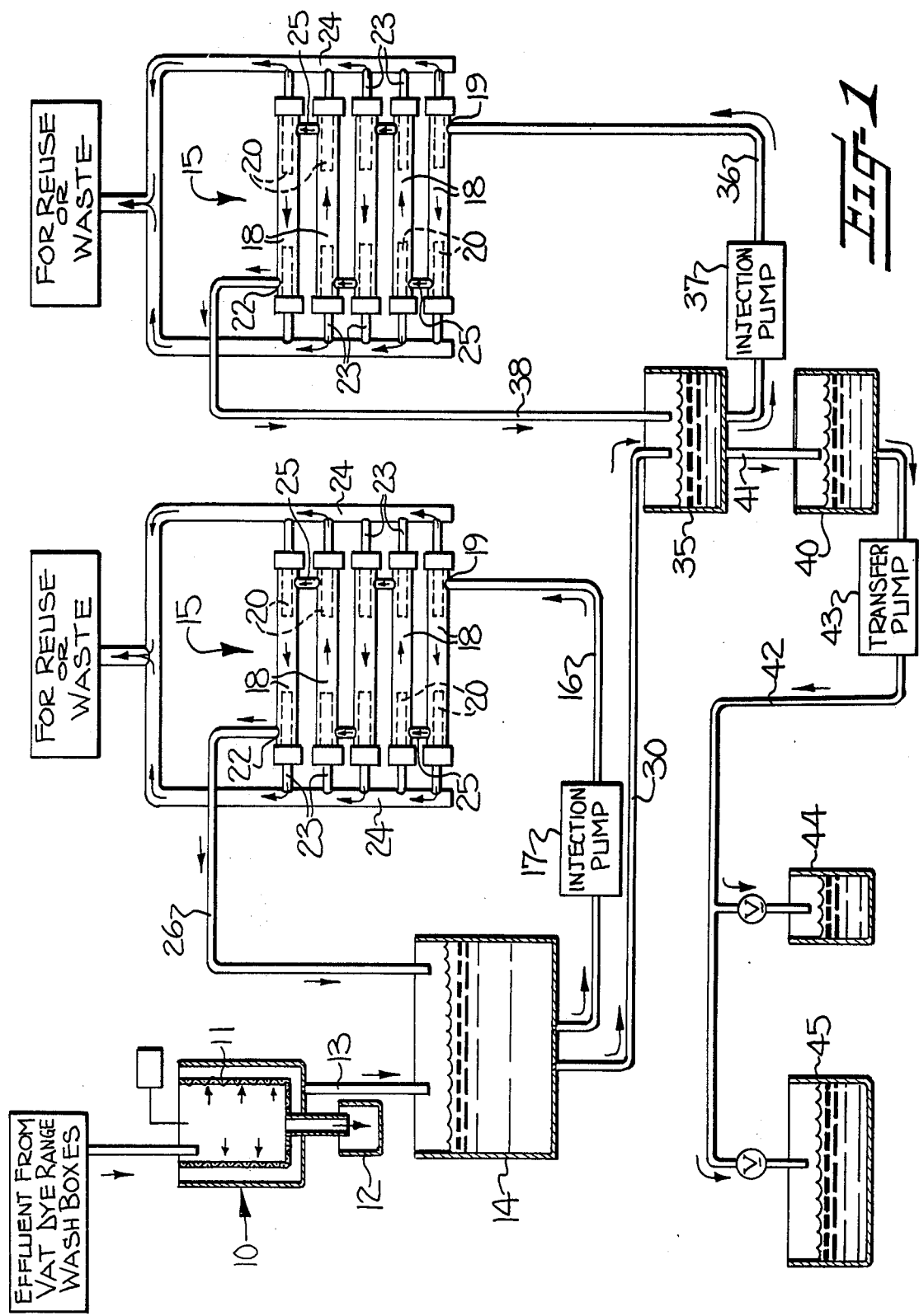
FIG. 1 is a schematic, diagrammatic view of apparatus which may be utilized in a first embodiment of the process of this invention.
Figure 2:
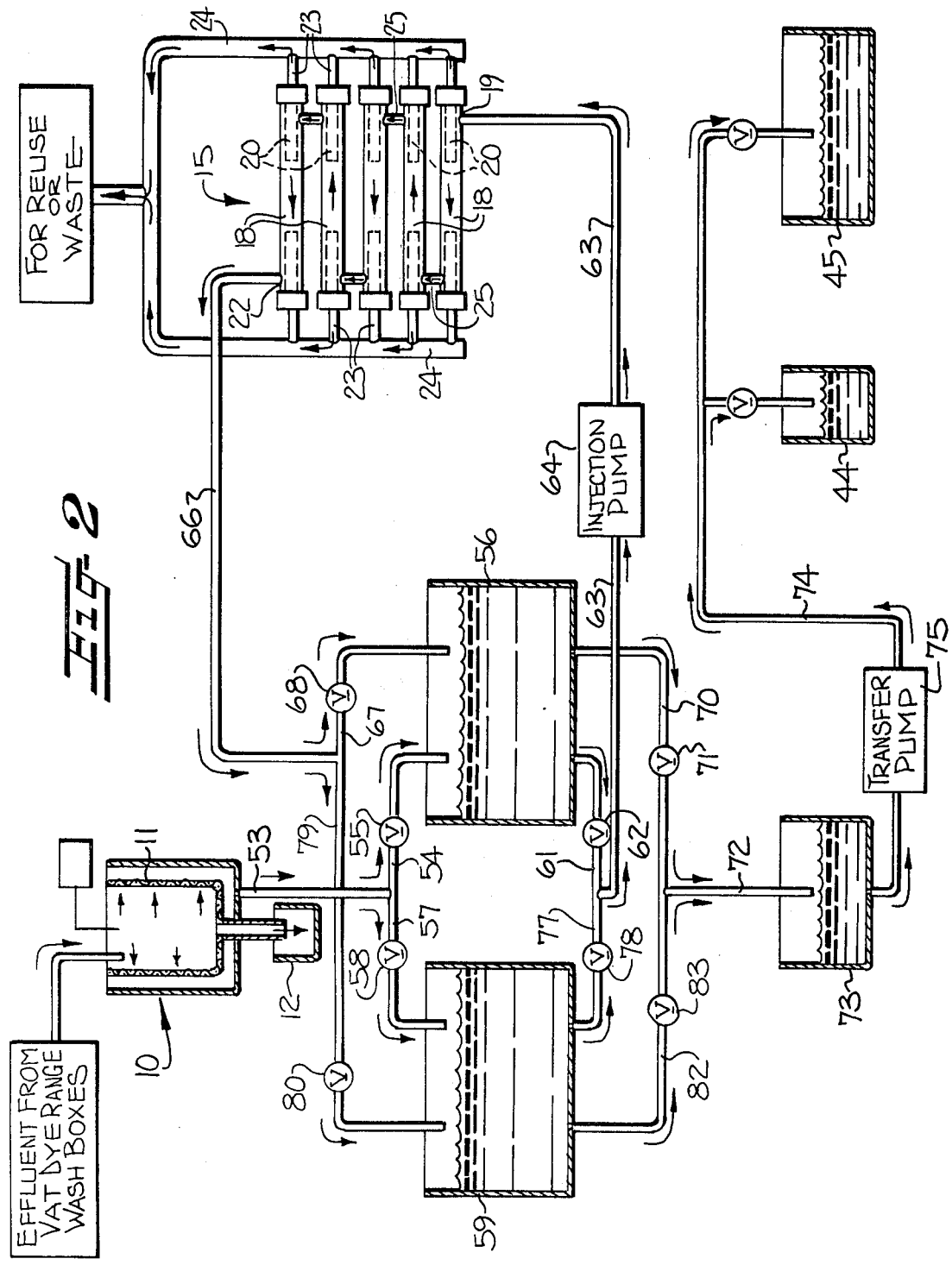
FIG. 2 is a schematic, diagrammatic view of apparatus which may be utilized in a second embodiment of the process of this invention.
Figure 3:
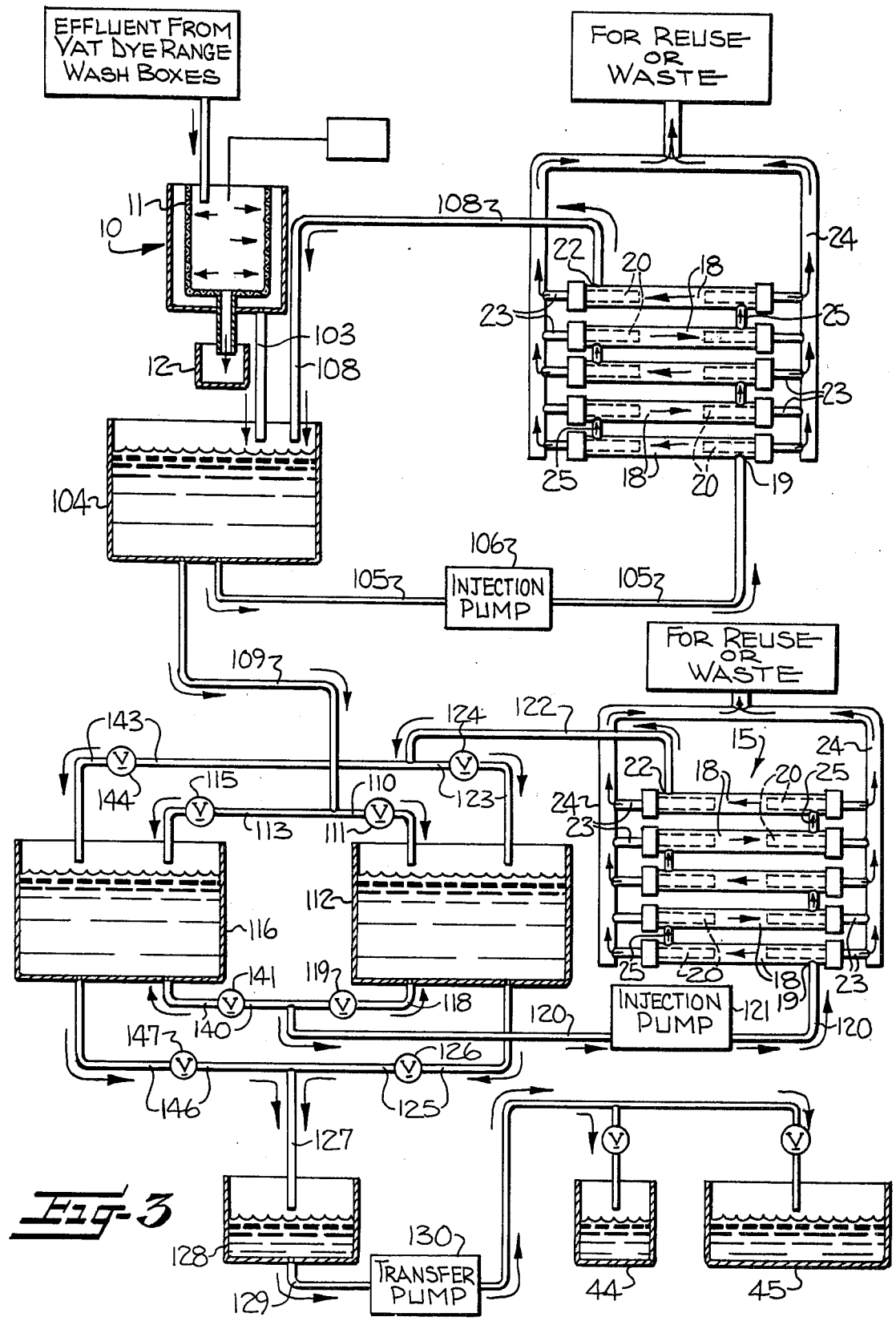
FIG. 3 is a schematic, diagrammatic view of apparatus which may be utilized in a third embodiment of the process of this invention.

In FIGS. 1-3 of the drawings there are illustrated three embodiments of the broad process of this invention, described above, and apparatus which may be utilized in practicing these three embodiments. The apparatus is shown schematically and diagrammatically and is commercially available apparatus, the construction and operation of which is well understood by those with ordinary skill in the art, and detailed illustration of this apparatus is not deemed necessary for an understanding of the present invention.

As illustrated in FIG. 1, effluent or waste water from a textile vat dye range is delivered to a centrifugal screen filter 10, having passageway therein of a predetermined size which may for example have a 50 micron screen filter 11 therein which operates in a manner well understood by those with ordinary skill in the art. The waste water is flowed through the screen filter 11 for removal of undissolved solid particles of the predetermined size and larger from the waste water. The solids flow into a solids removal device 12 and the filtered waste water continuously flows through conduit 13 into a first holding tank 14. The waste water from the holding tank 14 is continuously circulated and recirculated from the holding tank 14, through a reverse osmosis filtration means 15, while separating the waste water into a permeate and a concentrate, and removing the permeate at a predetermined rate and circulating the concentrate back to the first holding tank 14 for obtaining a desired initial concentrate of a ratio less than the ultimate desired ratio of from about 30/1 to 200/1.

Figure 4:
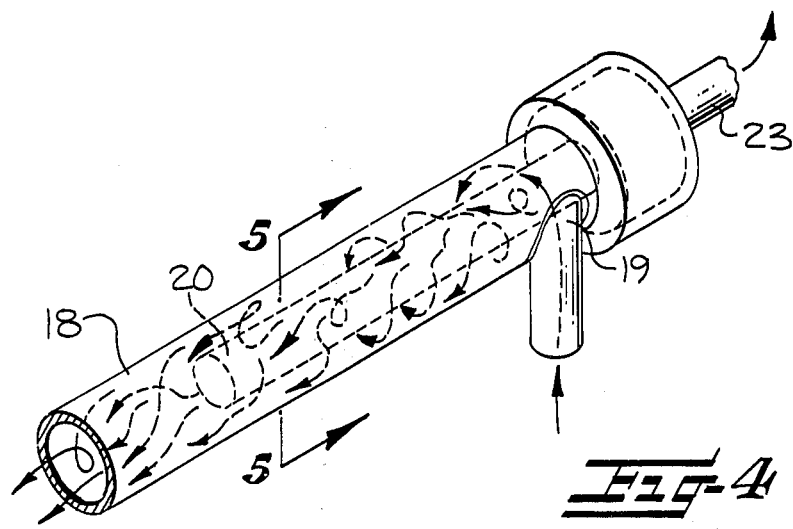
FIG. 4 is a schematic, perspective view of a reverse osmosis filtration device which may be utilized in the process of this invention.
Figure 5:
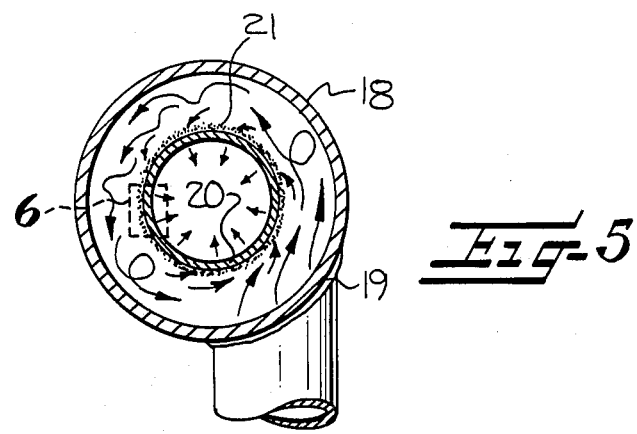
FIG. 5 is a cross-sectional view, taken generally along the line 5—5 of FIG. 4.
Figure 6:
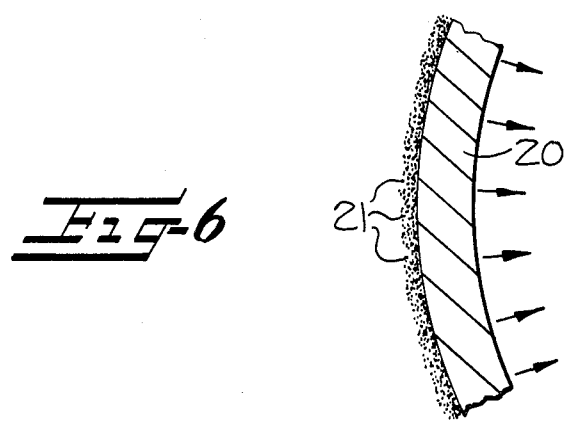
FIG. 6 is an enlarged cross-sectional detail taken generally within the square 6 of FIG. 5.

As may be seen, the waste water from the first holding tank 14 is circulated through conduit 16 and into the reverse osmosis filtration means 15 by an injection pump 17. The reverse osmosis filtration means 15 may comprise one or several banks of reverse osmosis filtration tubes 18, only one bank being shown in FIG. 1. Each of the reverse osmosis filtration tubes 18 includes an entry port 19 and an exit port 22. Within the tubes 18 are reverse osmosis filtration substrate tubes 20 extending inwardly from each end thereof (see also FIGS. 4-6). These substrate tubes are porous and preferably have a pore size from about 0.10 to 0.50 microns.

As discussed above, circulation of the waste water in contact with the substrate tubes 20 causes a build-up on the outside of the substrate tubes of a membrane 21 of the vat dyes in the waste water. And since the waste water is under pressure greater than the osmotic pressure of the membrane 21, the waste water will be separated into a permeate passing through the osmotic membrane 21 and substrate tube 20 which contains excess water and a substantial portion of the remaining impurities including salts and a concentrate which does not penetrate the osmotic membrane 21 and substrate tube 20 which contain substantially all of the vat dyes and a desired amount of water. The substrate tubes may be readily commercially obtained from a number of sources and may be in the form of a cluster or a single ceramic or stainless steel tube conventionally utilized in reverse osmosis filtration.

The permeate is removed from each tube 18 by flowing through conduits 23 communicating with the interior of each substrate tubes 20, through conduits 24 and to waste or for possible reuse in other textile operations. This permeate, basically containing water and caustic, may be suitable for reuse in other textile operations, such as a scrubber where caustic or salt level is not a problem. The concentrate passes from one tube 18 to the next tube 18 in series through the bank of tubes 18 by passing through conduits 25 connected with the exit port 22 and the entry port 19 of each tube and finally is recirculated back to the first holding tank 14 through conduit 26.

Preferably, the waste water is circulated through the reverse osmosis filtration device 15 at pressures from about 400 psig to 1300 psig or higher for obtaining a higher flux rate for the permeate, at temperatures from about 130° F. to 212° F. for allowing a greater portion of the impurities to pass in the permeate through the reverse osmosis filtration tubes 20 and membranes 21 thereon, and at the normal pH of the waste water of from about 9 to 14. This pressure and temperature also maintains a turbulent flow of the waste water through the tubes 18 to retard an excessive build-up of the self-formed membrane 21 of vat dyes.

It is desired to continuously concentrate the waste water by recirculation through the filtration device 15 and the holding tank 14 down to an approximately 15/1 ratio with respect to the volume of water being fed into the holding tank 14. For example, if 16 gallons per minute or any multiple thereof are continuously fed into the holding tank 14 from the centrifugal screen filter 10 through the conduit 13, and if 15 gallons per minute or any multiple thereof are continuously removed as permeates through the conduits 24 to waste, and if 1 gallon per minute or any multiple thereof is flowed from the holding tank 14 through the conduit 30, then the waste water will be continuously concentrated down to a 15/1 ratio.

In the continuation of the process, the concentrated waste water is continuously fed into a second holding tank 35. The waste water from the second holding tank 35 is continuously circulated and recirculated from the holding tank 35, through the reverse osmosis filtration means, which is constructed and operated the same as the above-described reverse osmosis filtration means 15 and is therefore given the same reference characters, while separating the waste water into a permeate and a concentrate, and removing the permeate at a predetermined rate and circulating the concentrate back to the second holding tank 35 for obtaining a further concentration down to the desired concentration of from about 30/1 to 200/1.

As may be seen, the waste water from the second holding tank 35 is circulated through conduit 36 and into the reverse osmosis filtration means 15 by an injection pump 37. The permeate from each of the tubes 18 is removed in the same manner by flowing through conduits 23 communicating with the interior of each of the substrate tubes 20, through conduits 24 and to waste. The concentrate passes from one tube 18 to the next tube 18 in series through the bank of tubes and is finally recirculated back to the second holding tank 35 by a conduit 38.

The flow rates during this recirculation would be sufficient to further concentrate the waste water down to the final desired concentration of from about 30/1 to 200/1 from the initial concentration of about 15/1. Also, the pressures and temperatures utilized would be the same as those described above with respect to the first filtering and separating operation.

From the second holding tank 35, the concentrate is fed into a tank 40 by a conduit 41 and may be fed from the tank 40, as desired, through a conduit 42 by a pump 43 to the conventionally utilized chemical feed tank 44 and dye makeup tank 45 of the textile vat dye range for reuse in dyeing textile materials.

The above-described first embodiment of this invention relates to a continuous process whereby waste water and concentrate are continuously fed, circulated and recirculated through the system and the permeate is continuously removed for obtaining the desired filtering and concentrating operation.

Referring now to FIG. 2, there is shown therein an embodiment of the process of this invention utilizing apparatus for batch or discontinuous treatment of the waste water. As illustrated therein, effluent or waste water from a textile vat dye range is delivered to a centrifugal screen filter, of the same type as the centrifugal screen filter 10 illustrated in FIG. 1 and therefore having the same reference numerals applied thereto. The waste water is flowed through the screen filter 11 for removal of undissolved solid particles of the predetermined size and larger from the waste water. The filtered waste water then flows through a conduit 53 and through conduit 54 and valve 55 into a first holding tank 56. When a predetermined amount of waste water has been received in the first holding tank 56, the valve 55 will be shut off and the waste water from the screen filter 10 will flow through the conduit 53, through a conduit 57 and valve 58 into a second holding tank 59.

In the meantime, while the second holding tank 59 is filling up, the predetermined volume of waste water in the first holding tank 56 will be circulated and recirculated from the first holding tank 56 through conduit 61, valve 62 and conduit 63 by an injection pump 64 into a reverse osmosis filtration means, constructed and operated the same as the above-described reverse osmosis filtration means 15 and therefore given the same reference numerals. As described above, circulation through the reverse osmosis filtration means 15 will separate the waste water into a permeate and a concentrate, and the permeate is removed at a predetermined rate and the concentrate is circulated back to the first holding tank 56 through a conduit 66, conduit 67 and valve 68 for progressively obtaining the desired concentrate of a progressively increasing ratio down to the desired amount of from about 30/1 to 200/1. The concentrate from the first holding tank 56 is removed by flowing therefrom through conduit 70, valve 71 and conduit 72 into a tank 73 from which the concentrate may be flowed through a conduit 74 by a pump 75 to a chemical feed tank 44 and dye makeup tank 45 of the textile vat dye range for reuse in the dyeing operation.

After the concentrate from the first holding tank 56 has been removed, a predetermined volume of waste water will have been received in the second holding tank 59. The valve 58 will then be closed and the valve 55 opened so that the waste water from the screen filter 10 may then again begin to provide a predetermined volume of waste water to the first holding tank 56. While the first holding tank 56 is filling up, the predetermined volume of waste water contained in the second holding tank 59 will be circulated and recirculated through the reverse osmosis filtration means 15 by flowing the waste water from the second holding tank 59 through a conduit 77, valve 78, which has been opened after valve 62 was closed, conduit 63 and injection pump 64. The concentrate from the reverse osmosis filtration means 15 will be circulated back to the second holding tank 59 through conduit 66, conduit 79 and valve 80, which has been opened after valve 68 has been closed, while the permeate is removed at a predetermined rate. After circulation and recirculation sufficient to obtain a concentrate of the desired ratio of from about 30/1 to 200/1 in the second holding tank 59, the concentrate will be removed therefrom through conduit 82, valve 83, which has been opened after valve 71 has been closed, and conduit 72 into tank 73 where it may be utilized, as described above.

Thus, this second embodiment of the process of this invention illustrated in FIG. 2 provides a discontinuous batch operation which effects filtration in the reverse osmosis filtration means 15 of a progressively increasing concentrate of from 0 to the desired concentration of from about 30/1 to 200/1. This embodiment offers an operating advantage, since the lower the concentration, the greater the flux rate through the substrate tubes 20 and membrane 21, a more efficient operation can be obtained. The same operating conditions, i.e. pressure, temperature and pH, may be utilized in this embodiment for obtaining the same advantages discussed above.

Referring how to FIG. 3, there is shown therein a third embodiment of the process of this invention utilizing apparatus for a combination continuous and batch treatment of the waste water. As shown therein, effluent or waste water from a textile vat dye range is delivered to a centrifugal screen filter, of the same type as the centrifugal screen filter 10 illustrated in FIGS. 1 and 2 and therefore having the same reference numerals applied thereto. The waste water is flowed through the screen filter 11 for removal of undissolved solid particles of the predetermined size and larger from the waste water. The filtered waste water then continuously flows through a conduit 103 into a first holding tank 104. The waste water from the first holding tank 104 is continuously circulated and recirculated from the holding tank 104, through a reverse osmosis filtration means, which is constructed and operated the same as the above-described reverse osmosis filtration means 15 and is thereby given the same reference characters, while separating the waste water into a permeate and a concentrate, and continuously removing the permeate at a predetermined rate and continuously circulating the concentrate back to the first holding tank 104 for obtaining a desired initial concentration of a ratio less than the ultimate desired ratio of 30/1 to 200/1 and preferably to an initial concentration of about 5/1.

As may be seen, the waste water from the first holding tank 104 is circulated through a conduit 105, by injection pump 106 and into the reverse osmosis filtration means 15 which is constructed and operated as described above. The concentrate from the reverse osmosis filtration means 15 is circulated back to the first holding tank 104 through conduit 108.

Thus, an initial desired concentration is obtained by a continuous operation in this third embodiment of the process of this invention illustrated in FIG. 3.

In the continuation of the process, the concentrate from the first holding tank 104 is fed continuously at a predetermined rate through conduit 109 and through conduit 110 and valve 111 into a second holding tank 112. When a predetermined amount of waste water has been received in the second holding tank 112, the valve 111 will be shut off and the waste water from the first holding tank 104 will flow through conduit 109 and through conduit 113 and valve 115, which has been opened, into a third holding tank 116.

In the meantime, while the third holding tank 116 is filling up, the predetermined volume of waste water in the second holding tank 112 will be circulated from the second holding tank 112 through conduit 118, valve 119 and conduit 120 by an injection pump 121 into a reverse osmosis filtration means, constructed and operated the same as the above-described reverse osmosis filtration means 15 and thereby given the same reference numerals. As described above, circulation through the reverse osmosis filtration means 15 will separate the waste water into a permeate and a concentrate, and the permeate is removed at a predetermined rate and the concentrate is circulated back to the second holding tank 112 through a conduit 122, conduit 123 and valve 124 for progressively obtaining the desired final concentration of a progressively increasing ratio down to from about 30/1 to 200/1. The concentrate from the second holding tank 112 is removed through a conduit 125, valve 126 and conduit 127 into a tank 128 from which the concentrate may be flowed through a conduit 129 by a transfer pump 130 to chemical feed tank 44 and dye makeup tank 45 of the textile vat dye range for reuse in the dyeing operation.

After the concentrate from the second holding tank 112 has been removed, a predetermined volume of concentrate will have been received in the third holding tank 116. The valve 115 will then be closed and the valve 111 opened so that the concentrate from the first holding tank 104 may then again begin to provide a predetermined volume of the concentrate to the second holding tank 112. While the second holding tank 112 is filling up, the predetermined volume of concentrate obtained in the third holding tank 116 will be circulated and recirculated through the reverse osmosis filtration means 15 by flowing the concentrate from the third holding tank 116 through a conduit 140, valve 141, which has been opened after the valve 119 was closed, conduit 120 and injection pump 121. The concentrate from the reverse osmosis filtration means 15 will be circulated back to the third holding tank 116 through conduit 122, conduit 143 and valve 144, which has been opened after valve 124 has been closed, while the permeate is removed at a predetermined rate. After circulation and recirculation sufficient to obtain a final concentrate of the desired ratio of from about 30/1 to 200/1 in the third holding tank 116, the concentrate will be removed therefrom through a conduit 146, valve 147, which has been opened after the valve 126 has been closed, and conduit 127 into the tank 128 where it may be utilized, as described above.

Thus, this third embodiment of the process of this invention illustrated in FIG. 3 provides a combination continuous and batch operation. The same operating conditions, i.e. pressure, temperature and pH, may be utilized in this embodiment for obtaining the same advantages discussed above.

Examples of actual test runs of the process of this invention, are as follows:

EXAMPLE 1

4,725 gallons of waste water collected from the wash boxes which follow the last dye box on an indigo dye range were pumped to a twelve inch Sweco Separator equipped with 325 mesh stainless steel screens to remove solids greater than 44 microns in size. The waste water was then concentrated to 47.25 gallons volume for a concentration of 100/1 by circulation and recirculation through a reverse osmosis filtration unit. The membrane filter supports or substrates in the filtration unit consisted of porous stainless steel tubes with 0.5 micron pore size inserted into each end of ¾ inch stainless steel pipes used as a casing and a series of these casings were connected in series to provide a bank. Self-built membranes of indigo formed on the stainless steel tubes within a few minutes of operation and the permeate through the filters were clear of dye. The unit was operated until the desired concentration ratio of 100/1 was reached.

Operating parameters were as follows:

| | |
|---|---|
| Indigo waste water flow to unit | 16.4 Gallons/Minute |
| Velocity of indigo waste water in filter unit | 15.62 Feet/Second |
| Pump | Triplex positive displacement |
| Pump pressure | 1000 psig |
| Temperature of indigo waste water | 150° F. |
| pH of indigo waste water | 11.5 |
| Observed average conductivity rejection | 24.4% |

-continued

| | |
|---|---|
| Clear permeate flux rate | 113 Gallons/Square foot of Filter Area/Day |

EXAMPLE 2

4,808 Gallons of waste water collected from the wash boxes which follow the last dye box on an indigo dye range were pumped to a twelve inch Sweco Separator equipped with 325 mesh stainless steel screens to remove solids greater than 44 microns in size. The waste water was then concentrated to 48.57 gallons volume for a concentration ratio of 99/1 by circulation and recirculation through a reverse osmosis filtration unit. The membrane filter supports or substrates in the filtration unit consisted of porous stainless steel tubes with 0.5 micron pore size inserted into each end of ⅜ inch stainless steel pipes used as a casing and a series of these casings were connected in series to provide a bank. A self-built membrane of indigo formed on the stainless steel tubes within a few minutes of operation and the permeate through the filters were clear of dye. The unit was operated until the desired concentration ratio of 99/1 was reached.

Operating parameters were as follows:

| | |
|---|---|
| Indigo waste water flow to unit | 16.4 Gallons/Minute |
| Velocity of indigo waste water in filter unit | 15.62 Feet/Second |
| Pump | Triplex positive displacement |
| Pump pressure | 1000 psig |
| Temperature of indigo waste water | 150° F. |
| pH of indigo waste water | 11.8 |
| Observed average conductivity rejection | 22.2% |
| Clear permeate flux rate | 50 Gallons/square foot of filter area/day |

EXAMPLE 3

7,670 Gallons of waste water collected from the wash boxes which follow the last dye box on an indigo dye range were pumped to a twelve inch Sweco Separator equipped with 325 mesh stainless steel screens to remove solids greater than 44 microns in size. The waste water was then concentrated to 38.35 gallons volume for a concentration ratio of 200/1 by circulation and recirculation through a reverse osmosis filtration unit. The membrane filter supports or substrates in the filtration unit consisted of clusters of porous ceramic tubes with 0.27 micron pore size inserted into each end of ⅜ inch stainless steel pipes as a casing and a series of these casings were connected in series to provide a bank. A self-built membrane of indigo formed on the ceramic tubes within a few minutes of operation and the permeate through the filters were clear of dye. The unit was operated until the desired concentration ratio of 200/1 was reached.

Operating parameters were as follows:

| | |
|---|---|
| Indigo waste water flow to unit | 13.7 Gallons/minute |
| Velocity of indigo waste water in filter unit | 15.2 feet/second |
| Pump | Triplex positive displacement |
| Pump pressure | 1000 psig |
| Temperature of indigo waste water | 150° F. |
| pH of indigo waste water | 11.6 |
| Observed average conductivity rejection | 17.9% |

-continued

| | |
|---|---|
| Clear permeate flux rate | 124 gallons/feet$^2$ of filter area/day |

From the above, it may be seen that the process of this invention provides a concentrate containing substantially all of the vat dyes contained in the waste water removed from the vat dye range, a desired amount of water and a salt or other impurity level which is no more than about 10–11% and which is within the tolerances provided for reuse of such a concentrate. A typical indigo vat dye range could be fed 2,413 gallons of dye and chemicals a day with the following mix:

| | |
|---|---|
| 340 gallons | Water including 3300 pounds of 20% indigo dye paste |
| 226 gallons | 50% Sodium hydroxide |
| 48 gallons | Sodium hydrosulfite |
| 654 gallons | Each day |
| 1759 gallons | Makeup water |
| 2413 gallons of mix including 3.3% indigo dye | |

The concentrate produced by the above examples contains 161 pounds of 100% indigo per 1759 gallons of concentrate. Therefore, it may readily be seen that this 1759 gallons of concentrate could be utilized in lieu of the 1759 gallons of makeup water in the 2413 gallon mix listed above. The indigo dye included in the concentrate reduces the amount of indigo dye paste from 340 gallons to 253 gallons and therefore an additional 87 gallons of concentrate could be used making a total of 1846 gallons of concentrate utilized each day. Therefore, the amount of indigo dye and water used is considerably reduced by reuse of the concentrate produced by the process of this invention.

Therefore, this invention has provided, for the first time, a process of treating waste water from a textile vat dyeing operation to produce a concentrate suitable for direct reuse in the vat dyeing operation to conserve the use of dyes and water without requiring any further or additional treatment of the concentrate.

In the drawings and specification, there have been set forth preferred embodiments of the process of this invention and although specific terms are employed, they are used in a generic and descriptive sense only and not for purposes of limitation.

What is claimed is:

1. Process of treating waste water from a textile vat dyeing operation containing water, vat dyes, and dissolved and undissolved impurities normally including salts, lint, foreign matter, etc., to produce a concentrate suitable for reuse in the vat dyeing operation to conserve the use of dyes and water; said process comprising the steps of:

removing undissolved impurities including lint and foreign matter from the vat dye waste water by passing the waste water through a filter having passageways therein of a predetermined size of at least 40 microns for filtering out and removal of undissolved particles of the predetermined size and larger; and thereafter concentrating the waste water down to a concentrate suitable for reuse in the dyeing operation of a ratio of from about 30/1 to 200/1 by circulating the waste water, at its normal pH of from about 9 to 13 and at pressures from about 400 psig to 1300 psig or higher and at temperatures of from about 130° F. to about 212° F. for creating a turbulent flow of the waste water, through reverse osmosis filtration means including substrate tubes without the normal dynamically formed membranes thereon and having a pore size of from about 0.10 to 0.50 microns, while building up and maintaining a desired amount of build-up on the tubes of a self-formed membrane of the vat dyes in the waste water and filtering and separating of the waste water into a permeate containing excess water and a substantial portion of the remaining impurities including salts and a concentrate containing substantially all of the vat dyes and a desired amount of water, and by removing the permeate and retaining the concentrate for reuse in the dyeing operation;

whereby, utilization of self-formed vat dye membranes eliminates the necessity of lowering the pH of the waste water by costly further treatment because of the adverse affects on normal dynamically formed reverse osmosis membranes, and excessive build-up of the vat dye membranes and the desired filtering and separating action are maintained by the turbulent flow of the waste water in contact with the substrate tubes of the reverse osmosis filtration means.

2. The process, as set forth in claim 1, in which said step of thereafter concentrating and filtering the waste water further comprises continuously flowing the filtered waste water at a predetermined rate into a first holding tank means, continuously circulating and recirculating the waste water from the first holding tank means through a first reverse osmosis filtration means, while separating the waste water into the permeate and the concentrate, removing the permeate at a predetermined rate, and circulating the concentrate at predetermined rates back to the first holding tank means and to a second holding tank means for obtaining a desired initial concentrate of a ratio of less than the ultimate desired ratio of 30/1 to 200/1 in the second holding tank means, and continuously circulating and recirculating the concentrated waste water from the second holding tank means through a second reverse osmosis filtration means, while separating the waste water into a permeate and a concentrate, removing the permeate at a predetermined rate, and circulating the concentrate back to the second holding tank means and to a collection means at predetermined rates for obtaining a final concentrate of the desired ratio of from about 30/1 to 200/1 in the collecting means for reuse in the vat dyeing operation.

3. The process, as set forth in claim 1, in which said step of thereafter concentrating and filtering the waste water further comprises alternately and continuously flowing the filtered waste water into a first holding tank means until a predetermined volume of the waste water is obtained therein and then into a second holding tank means until a predetermined volume of the waste water is obtained therein, alternately and continuously circulating and recirculating the predetermined volume of the waste water from the first holding tank means and then from the second holding tank means through a reverse osmosis filtration means, while separating the waste water into a permeate and a concentrate, removing the permeate at a predetermined rate, and circulating the concentrate back to the respective holding tank means for progressively obtaining the desired concentrate of a progressively increasing ratio down to the desired ratio of from about 30/1 to 200/1 in the first holding tank means and then in the second holding tank means, and alternately flowing the concentrate from the first holding tank means and then the second holding tank means and collecting the concentrate for reuse in the vat dyeing operation.

4. The process, as set forth in claim 1, in which said step of thereafter concentrating and filtering the waste water further comprises continuously flowing the filtered waste water at a predetermined rate into a first holding tank means, continuously circulating and recirculating the waste water from the first holding tank means through a first reverse osmosis filtration means, while separating the waste water into a permeate and a concentrate, removing the permeate at a predetermined rate, and circulating the concentrate back to the first holding tank means and alternately to second and third holding tank means at predetermined rates for obtaining a desired initial concentration of a ratio less than the ultimate desired ratio of from about 30/1 to 200/1 and for obtaining a predetermined volume of the initially concentrated waste water in the second holding tank means and then a predetermined volume of the initially concentrated waste water in the third holding tank means, alternately and continuously circulating and recirculating the predetermined volume of the initially concentrated waste water from the second holding tank means and then from the third holding tank means through a second reverse osmosis filtration means, while separating the waste water into a permeate and a concentrate, removing the permeate at a predetermined rate, and circulating the concentrate back to the respective holding tank means for progressively obtaining a further concentration down to the desired ratio of from about 30/1 to 200/1 in the second holding tank means and then in the third holding tank means, and alternately flowing the concentrate from the second holding tank means and then the third holding tank means and collecting the concentrate for reuse in the vat dyeing operation.

* * * * *

UNITED STATES PATENT AND TRADEMARK OFFICE
CERTIFICATE OF CORRECTION

PATENT NO. : 4,165,288
DATED : August 21, 1979
INVENTOR(S) : Richard K. Teed and Ernest A. Freeman, Jr.

It is certified that error appears in the above-identified patent and that said Letters Patent are hereby corrected as shown below:

Column 1, line 10, delete "resue" and insert --reuse--;
Column 3, line 31, delete "Issued" and insert --Issue--;
Column 4, line 34, delete "of" and insert --or--;
Column 7, line 19, delete "the" and insert --a--;
Column 9, line 3, delete "how" and insert --now--;
Column 12, line 19, delete "226" and insert --266--.

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*